(12) United States Patent
Lindoff et al.

(10) Patent No.: US 8,503,946 B2
(45) Date of Patent: Aug. 6, 2013

(54) METHOD AND SYSTEM AND DEVICE FOR CQI ESTIMATION DISTURBANCE CANCELLATION

(75) Inventors: Bengt Lindoff, Bjärred (SE); Bo Lincoln, Lund (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 208 days.

(21) Appl. No.: 13/059,892

(22) PCT Filed: Jul. 10, 2009

(86) PCT No.: PCT/EP2009/058812
§ 371 (c)(1),
(2), (4) Date: Mar. 9, 2011

(87) PCT Pub. No.: WO2010/020478
PCT Pub. Date: Feb. 25, 2010

(65) Prior Publication Data
US 2011/0305268 A1  Dec. 15, 2011

Related U.S. Application Data (60) Provisional application No. 61/090,293, filed on Aug. 20, 2008.

(30) Foreign Application Priority Data

Aug. 19, 2008 (EP) .................................. 08162581

(51) Int. Cl.
*H04B 17/00* (2006.01)

(52) U.S. Cl.
USPC ........ 455/67.13; 455/449; 455/450; 370/252; 370/328; 375/227

(58) Field of Classification Search
USPC ......... 455/67.13, 449, 452.1, 452.2; 370/252, 370/328, 329, 338; 375/227
See application file for complete search history.

(56) References Cited

U.S. PATENT DOCUMENTS 7,061,967 B2 * 6/2006 Schelm et al. ................. 375/147
2007/0217495 A1 * 9/2007 Han et al. ...................... 375/227

FOREIGN PATENT DOCUMENTS

WO  2007/021159 A2  2/2007

* cited by examiner

*Primary Examiner* — Tuan H Nguyen
(74) *Attorney, Agent, or Firm* — Coats & Bennett, P.L.L.C.

(57) ABSTRACT

The current invention relates to a method of determining a quality of a received signal, wherein the method comprises receiving a signal comprising a first part and a second part and wherein at least the second part of the received signal comprises a scrambling sequence period; and determining a first noise-and-interference power of the first part of the received signal by removing a second noise-and-interference power of the second part of the signal, wherein the scrambling sequence period is utilized in the removal. The invention further relates to a corresponding device and system. Thereby, the invention is able to, among other things, reduce neighbor cell reference symbol interference in a dense network.

20 Claims, 6 Drawing Sheets

METHOD AND SYSTEM AND DEVICE FOR CQI ESTIMATION DISTURBANCE CANCELLATION

TECHNICAL FIELD

The invention relates to a method of determining a quality of a received signal. The invention further relates to a corresponding device and system.

BACKGROUND

In a cellular network, such as a $3^{rd}$ generation partnership project (3GPP) Long Term Evolution (LTE) network, each cell in the network may employ a base station, e.g. an eNodeB, which communicates with user equipment (UE), such as for example a cellular mobile telephone, a laptop, or a PDA, which is located within its respective cell.

Performance of a packet based wireless networks, such as a 3GPP LTE network, may rely on efficient channel-dependent scheduling. An accurate channel quality index (CQI) reported by a UE to a cell may be a prerequisite for successful operation of such a wireless networks.

CQI may be reported by the user equipment using several granularities. Additionally, CQI may be reported on a wide-band or sub-band basis. Wideband CQI reporting may be performed along the entire network bandwidth and may be mapped onto 16 different CQI values. Sub-band CQI reporting may be reported differentially with respect to the wideband CQI.

CQI parameters reported by the UE may be determined by the network/cell. For example, the network may determine whether wideband CQI should be reported by the user equipment or whether sub-band CQI down to the level of one or more resource blocks (RBs) should be reported by the user equipment.

In 3GPP LTE, CQI may comprise a number of elements such as:

A modulation and coding scheme: An index into a table with different modulation and coding schemes. The index may, for example, be based on the UE estimated signal-to-noise and interference ratio (SINR).

A pre-coding matrix index: In multiple-input multiple-output (MIMO), an index into a pre-coding matrix table can be supplied such that the network can perform an optimal pre-coding to the data streams from the network to the UE.

A rank: The UE may report the number of streams it wants the network to transmit data on.

A CQI report may be based on, for example, two estimated quantities in the UE: A channel estimate $\hat{H}$ and a noise-and-interference power estimate $\hat{\sigma}^2$. Each of the above estimated quantities may be defined per resource element in an OFDM time-frequency grid.

The noise-and-interference power estimate may be calculated as $$\hat{\sigma} = E\{K_{bias}(\hat{H}-Y)^H(\hat{H}-Y)\},$$

where Y is a received and known OFDM symbol such as for example a reference symbol, e.g. a reference symbol, and $K_{bias}$ is a constant which ensures a bias-free estimate of the variance. The expectation $E(.)$ may be estimated as the average over a certain number of symbols.

In 3GPP LTE, the reference symbols are transmitted in a certain pattern of the OFDM time-frequency grid. In synchronized networks, i.e. where the radio frame structure of several eNodeBs are synchronized in time, as for example LTE time-division-duplex (TDD) networks, the reference symbol patterns of a plurality of the cells/eNodeBs may overlap and create interference to UEs. For example, a mobile phone at an edge between two or more cells/eNodeBs may receive reference symbols from a plurality of cells/eNodeBs. To avoid reference symbol overlap, the 3GPP LTE standard has taken two measures:

Firstly, the reference symbols may be scrambled by a cell-ID-specific sequence, whereby reference symbol interference from neighbouring cells may be seen as white noise by the receiver.

Secondly, the reference symbol pattern may be defined with six different shifts in frequency (reference-symbol frequency hopping). Thus, if there is transmitter (antenna port) diversity, e.g. more than one antenna port at a cell/eNodeB, the number of non-overlapping shifts may be reduced to three.

Thus, with optimal cell planning, the frequency shifts can be chosen such that the reference symbols of closest neighbouring cells substantially do not interfere with a serving cell serving a UE.

However, in dense networks, such as for example in a city, even with optimal cell planning (in terms of, for example, scrambling sequence and frequency shifts) the reference symbols from several neighbouring cells in the network may overlap and interfere with the serving cell reference symbols.

As an example, cells in a low load network will typically only transmit control data and reference symbols and thus at the data symbol's resource blocks, the interference from neighbouring cells is very low. Therefore, a serving cell may transmit at a very high data rate to the UE due to the low data symbol interference.

However, since the estimated noise-and-interference power $\hat{\sigma}^2$ is typically estimated from the reference symbols in the UE, where the neighbouring cells in a low load network do transmit reference symbols, the noise-and-interference power estimate $\hat{\sigma}^2$ based on the reference symbols may be much higher than the noise-and-interference power of the data symbols, where the neighbouring cells in a low load network substantially do not transmit. Therefore, the UE may report very pessimistic CQI values i.e. the UE may report a low CQI value indicating high noise level while the actual CQI value is high indicating low noise level. Network simulations have shown a 40% total network throughput loss in low load scenarios due to this effect.

WO 2007/021159 shows a method and a device of an OFDM system in which a CINR (carrier to interference-plus noise ratio) is estimated when a transmit power of a preamble subcarrier or pilot subcarrier is different from a transmit power of a data subcarrier in the OFDM system. An average of the CINR is calculated using the CINR value of the preamble and the non-transmit subcarrier noise power.

Thus, it would be advantageous to be able to, for example, determine a more accurate CQI estimate and/or a more accurate noise-and-interference power estimate.

Alternatively or additionally, it would be advantageous to be able to, for example, reduce cell-planning requirements to a wireless network.

SUMMARY

The above and other advantages are obtained by a method of determining a quality of a received signal, wherein the method comprises receiving a signal comprising a first part and a second part and wherein at least the second part of the received signal comprises a scrambling sequence period; and determining a first noise-and-interference power of the first part of the received signal by removing a second noise-andinterference power of the second part of the signal, wherein the scrambling sequence period is utilized in the removal.

Thereby, the invention is able to, e.g. in synchronized networks such as for example LTE TDD or LTE FDD where reference symbols from different cells, e.g. serving cell and neighboring cells, may overlap/interfere and substantially reduce the interference by utilizing information regarding the periodicity of the scrambling sequence. In LTE, for example, the scrambling sequence is applied to reference symbols of all cells/transmitters and the scrambling sequence is periodic with a period of 10 ms in the standard configuration.

Thus, the invention is able to estimate the noise-and-interference power of a received signal by cancelling neighboring cell interference using the fact that the scrambling sequence is periodic.

Additionally, the invention is able to provide a correct noise-and-interference power when no synchronous reference symbol interference exists, e.g. in a less dense network.

Thus, the invention may provide a more accurate noise-and-interference power estimate and thereby a more accurate CQI estimate, which may be correlated to the noise-and-interference estimate e.g. via a table using the noise-and-interference estimate as index.

Further, the invention may reduce cell-planning requirements to a wireless network because the invention is able to provide more accurate CQI estimates and thereby, the cells in the wireless network may be placed with fewer restrictions.

In an embodiment, the determining a first noise-and-interference power comprises summing over a first frequency interval and a first time-interval a Hermitian conjugate of a difference between a channel estimate and a received signal at a first time and a second time, wherein the Hermitian conjugation is multiplied with a difference between a channel estimate and a received signal at a first time and a second time, and wherein the difference between the first and second time equals a multiple of the scrambling sequence period.

Thereby, the invention is able to determine the first noise-and-interference power as $$\hat{\sigma}_{k,l}^{extended^2} = \frac{K_{bias}}{2} \sum_{\kappa,\lambda \in S(k,l)} (e_{\kappa,\lambda-d} - e_{\kappa,\lambda})^H (e_{\kappa,\lambda-d} - e_{\kappa,\lambda}),$$

where $e_{\kappa,\lambda}$ is an instantaneous noise-and-interference estimate at subcarrier frequency $\kappa$ and time-instance $\lambda$ and d is the length of the scrambling sequence period. $e_{\kappa,\lambda}$ may be related to the channel estimate $\hat{H}_{k,l}$ and the received signal $Y_{k,l}$ via, for example, $e_{k,l} = \hat{H}_{k,l} - Y_{k,l}$.

In an embodiment, the determining a first noise-and-interference power is performed according to the equation $$\hat{\sigma}_{k,l}^{extended^2} = \frac{K_{bias}}{2} \sum_{\kappa,\lambda \in S(k,l)} (e_{\kappa,\lambda-d} - e_{\kappa,\lambda})^H (e_{\kappa,\lambda-d} - e_{\kappa,\lambda}), \text{ where } \frac{K_{bias}}{2}$$

is a constant and $$\sum_{\kappa,\lambda \in S(k,l)} ( \dots )$$

is a summation over the indices $\kappa$, $\lambda$ with values in the set $S(k,l)$ of an instantaneous noise-and-interference estimate at subcarrier frequency $\kappa$ and time-instance $\lambda$, $e_{\kappa,\lambda}$, and H denotes a Hermitian conjugation, and d comprises the length of scrambling sequence period.

Thereby, the invention is able to determine the first noise-and-interference power as $$\hat{\sigma}_{k,l}^{extended^2} = \frac{K_{bias}}{2} \sum_{\kappa,\lambda \in S(k,l)} (e_{\kappa,\lambda-d} - e_{\kappa,\lambda})^H (e_{\kappa,\lambda-d} - e_{\kappa,\lambda}),$$

where $e_{\kappa,\lambda}$ is an instantaneous noise-and-interference estimate at subcarrier frequency $\kappa$ and time-instance $\lambda$ and d is the length of the scrambling sequence period. $e_{\kappa,\lambda}$ may be related to the channel estimate $\hat{H}_{k,l}$ and the received signal $Y_{k,l}$ via, for example, $e_{k,l} = \hat{H}_{k,l} - Y_{k,l}$.

In an embodiment, the method further comprises determining a second noise-and-interference power by summing a Hermitian conjugate of a difference between a channel estimate and a received signal over the first frequency interval and the first time-interval, wherein the Hermitian conjugation is multiplied with a difference between a channel estimate and a received signal over the first frequency interval and the first time-interval and wherein the method further comprises determining a minimum of the first noise-and-interference power and the second noise-and-interference power.

Thereby, the invention is able to determine the lowest value of the two estimates of the noise-and-interference power i.e. the lowest value of the first noise-and-interference power and the second noise-and-interference power and thus, the invention is able to accurately estimate the noise-and-interference power in a user equipment moving at any velocity.

In an embodiment, the method further comprises comparing the first noise-and-interference power to the second noise-and-interference power and if the first noise-and-interference power is substantially equal to the second noise-and-interference power then determining that interference between the first part and the second part of the received signal is due to other sources and otherwise determining that the interference is due to neighbour interference.

Thereby, the invention is able to determine whether interference observed in the received signal is due to neighbour reference symbol interference or whether it is due to e.g. thermal noise or noise from data from neighbouring cells. If, for example, the first and second estimates of the noise-and-interference power are substantially equal then it may be concluded that the interference is due to other sources than neighbour reference symbol interference because otherwise the second noise-and-interference power estimate comprising the neighbour reference symbol interference should be greater than the first noise-and-interference power estimate not comprising the neighbour reference symbol interference.

In an embodiment, the method further comprises determining a CQI value based on a table lookup using the minimum as index to the table and transmitting the CQI value to a network.

Thereby, the method is able to report a CQI value to a network e.g. to adjust data transfer according to the quality of a channel over which the method receives data (received signal).

In an embodiment, the quality of a received signal is determined as the first noise-and-interference power if a velocity of the user equipment is in a range up to and including a Doppler frequency of 10 Hz and as a minimum of the first noise-and-interference power and the second noise-and-interference power otherwise.

Thereby, the invention is able to accurately estimate the received signal quality irrespective of the velocity of the user equipment.

As mentioned, the invention also relates to a device for determining a quality of a received signal, wherein the device comprises at least one receiver adapted to receive a signal comprising a first part and a second part and wherein at least the second part of the received signal comprises a scrambling sequence period; and at least one estimator adapted to determine a first noise-and-interference power of the first part of the received signal by removing a second noise-and-interference power of the second part of the signal, wherein a length of the scrambling sequence period is utilized in the removal.

The device and embodiments thereof correspond to the method and embodiments thereof and have the same advantages for the same reasons.

Embodiments of the present invention also relates to a system for determining a quality of a received signal, wherein the system comprises a device according to an embodiment and a serving cell and at least one neighboring cell.

The system and embodiments thereof correspond to the device and embodiments thereof and have the same advantages for the same reasons.

BRIEF DESCRIPTION OF THE DRAWINGS

The invention will now be described more fully below with reference to the drawings, in which.

DETAILED DESCRIPTION

In Orthogonal Frequency Division Multiplexing (OFDM) systems a multi carrier approach, in which an original data stream to be transmitted from a transmitter to a receiver is multiplexed into a number of parallel data streams with a correspondingly low symbol rate, is used to reduce inter symbol interference (ISI) by reducing the symbol rate without reducing the data rate. The inter symbol interference is caused by delay spread of the channel impulse response for the multipath channel over which the signals are transmitted. Each of the parallel data streams are modulated with a different sub-carrier frequency and the resulting signals are transmitted together in the same band from a transmitter to a receiver e.g. from a cell to a UE. Typically, a high number of different sub-carrier frequencies, i.e. several hundreds or even thousands, will be used, and these frequencies will be very close to each other. In the receiver a Fast Fourier Transform (FFT) is used for separating the parallel data streams and recovering the original data stream.

3GPP LTE is a proposal for a new flexible mobile cellular system using OFDM as multiple access technique in the downlink. The description below uses 3GPP LTE as an example, but it is noted that other systems can be used as well.

It is noted that 3GPP LTE supports both frequency- and time-division-based duplex. Frequency Division Duplex (FDD) implies that downlink and uplink transmission takes place on different frequency bands, while Time Division Duplex (TDD) implies that downlink and uplink transmission take place in different, non-overlapping time slots.

Figure 1A:
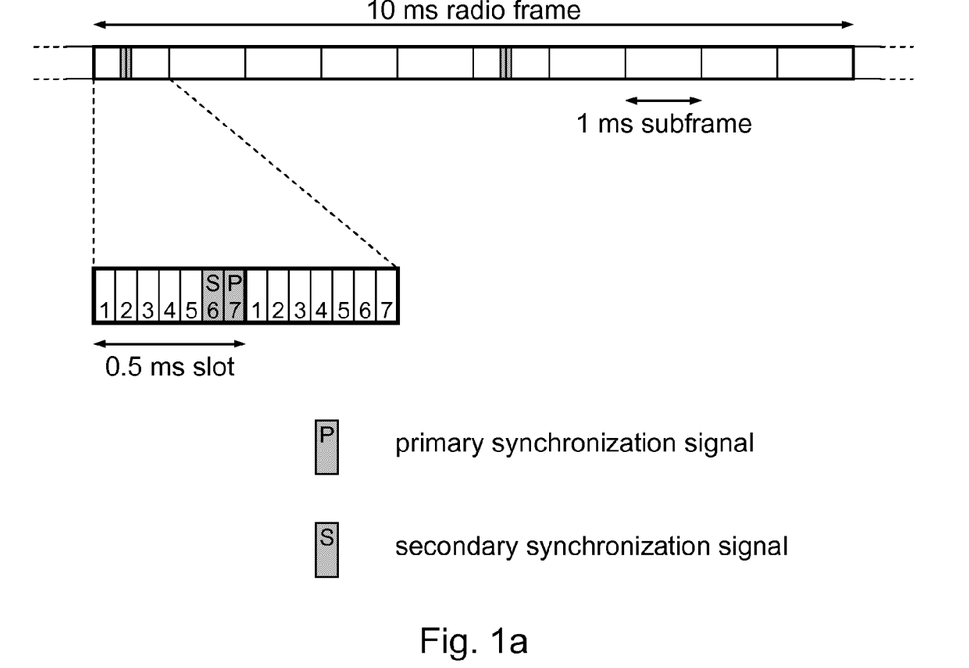
FIG. 1a shows the time domain structure for 3GPP LTE transmission in the case of FDD.
Figure 1B:
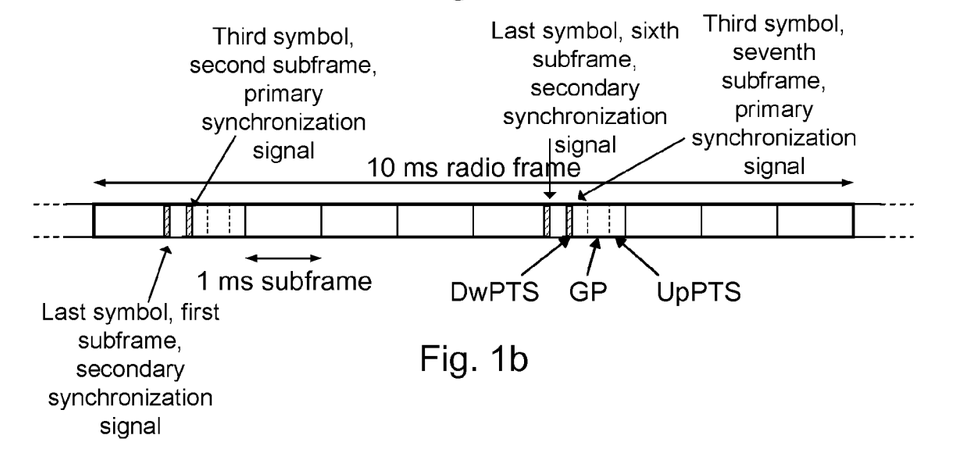
FIG. 1b shows the corresponding time domain structure for 3GPP LTE transmission in the case of TDD.

FIG. 1a illustrates the time domain structure for 3GPP LTE transmission in the case of FDD, which defines a frame of 10 ms length consisting of ten equally sized subframes of length 1 ms. Each 1 ms subframe consists of two equally sized slots of length 0.5 ms, and each slot consists of a number (seven symbols in normal cyclic prefix and six in extended cyclic prefix) of OFDM symbols. The first and sixth subframes of each frame include synchronization signals, which are transmitted on the downlink of each cell for use in the cell search procedure. A primary synchronization signal (P-SCH) and a secondary synchronization signal (S-SCH) are provided, which are specific sequences that are inserted into the last two OFDM symbols in the first slot of the first and sixth subframes. FIG. 1b illustrates the corresponding time domain structure for 3GPP LTE transmission in the case of TDD, where the secondary synchronization signal is transmitted in the last symbol of the first and sixth subframes, and the primary synchronization signal is transmitted in the third symbol of the next slot, which is also called the DwPTS slot. In this slot the switch between downlink and uplink transmission occurs.

Figure 2A:
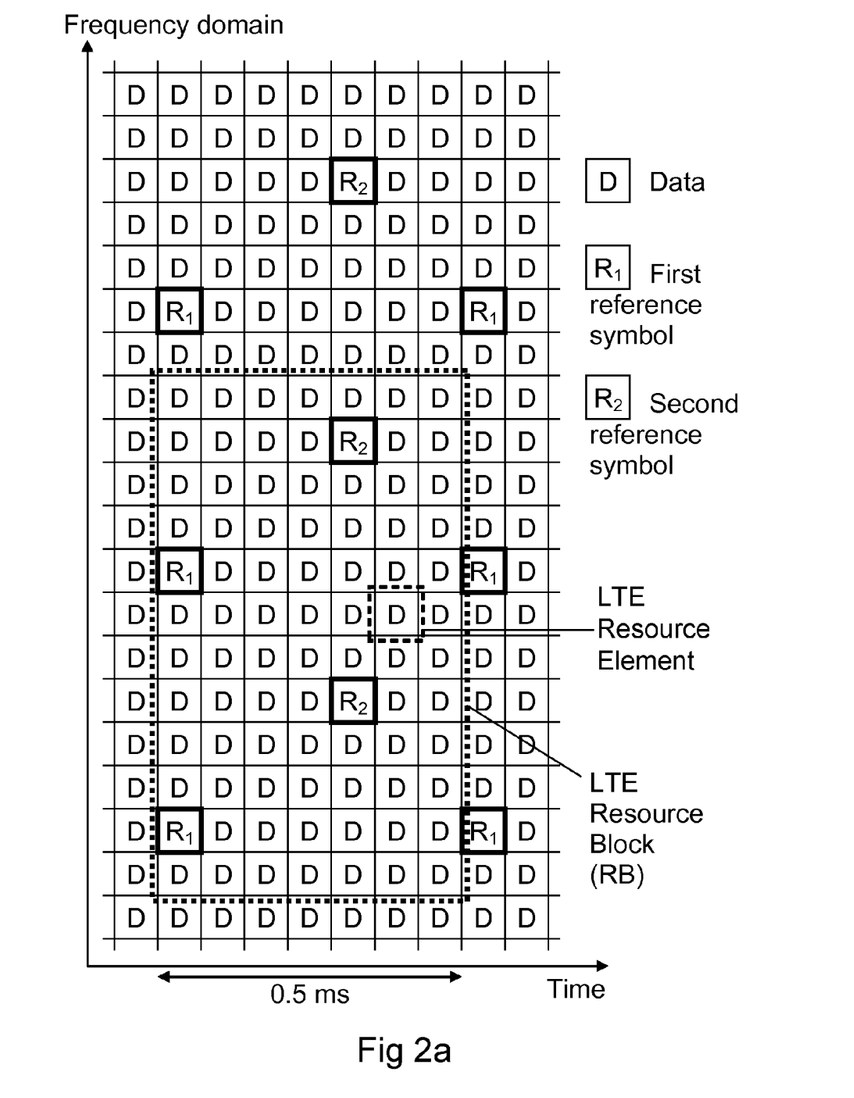
FIG. 2a shows a 3GPP LTE resource block and resource elements and reference symbols.

As the transmission is based on OFDM, the basic LTE downlink physical resource can be seen as a time-frequency resource grid, where each resource element corresponds to one OFDM subcarrier during one OFDM symbol interval. The subcarriers are grouped into resource blocks, where each resource block consists of 12 consecutive subcarriers during a 0.5 ms slot, i.e. each resource block consists of 12·7=84 resource elements in the normal cyclic prefix case. This is illustrated in FIG. 2a, which also shows the location of a first $R_1$ and a second $R_2$ reference symbol.

To enable channel estimation, known reference symbols, e.g. $R_1$ and $R_2$, are inserted into the OFDM time-frequency grid. They are inserted within the first and the third last OFDM symbols of each slot and with a frequency-domain spacing of six subcarriers, and there is a frequency-domain staggering of three subcarriers between the first and second reference symbols. Thus there are four reference symbols within each resource block, as it is also shown in FIG. 2a. The reference symbols are also referred to as CQI (Channel Quality Indicator) pilots.

Channel estimation may, for example, be performed by using knowledge regarding position of the reference symbols in the OFDM time-frequency grid to estimate a frequency-channel around the location of a reference symbol. The estimation of the frequency-channel may, for example, be performed using minimum-mean-square-error estimation based on knowledge of the channel time/frequency-domain characteristics.

The complex values of the reference symbols will vary between different reference symbol positions and between different cells. The LTE reference signal sequence can be seen as an indicator of the cell identity. Each reference signal sequence can be considered as a product of a two-dimensional pseudo-random sequence and a two-dimensional orthogonal sequence. The LTE specification defines a total of 168 different pseudo-random sequences, each corresponding to one out of 168 cell identity groups. There are defined three orthogonal sequences, each corresponding to a specific cell identity within each cell identity group.

As mentioned above, the orthogonal sequence used for a sequence of transmitted reference symbols is to be determined in a receiver for detecting the cell identity of a new or another cell in a third step of a cell search procedure. This is done by correlating a received sequence of reference symbols with each one of the possible known orthogonal sequences and identifying the received as the known sequence giving the largest correlation result.

The reference symbols may be scrambled with a pseudo-random sequence to discriminate between cells in different cell groups and then orthogonal sequences are applied on the reference symbols, where the orthogonality is within the cell group.

For example, in LTE all reference symbols RSs may be scrambled (even the serving cell RS). Once the RSs have been de-scrambled by a scrambling sequence contained in the UE, the serving cell RS appear in "clear" i.e. readable by the UE, whereas all other RSs remain scrambled.

Figure 3:
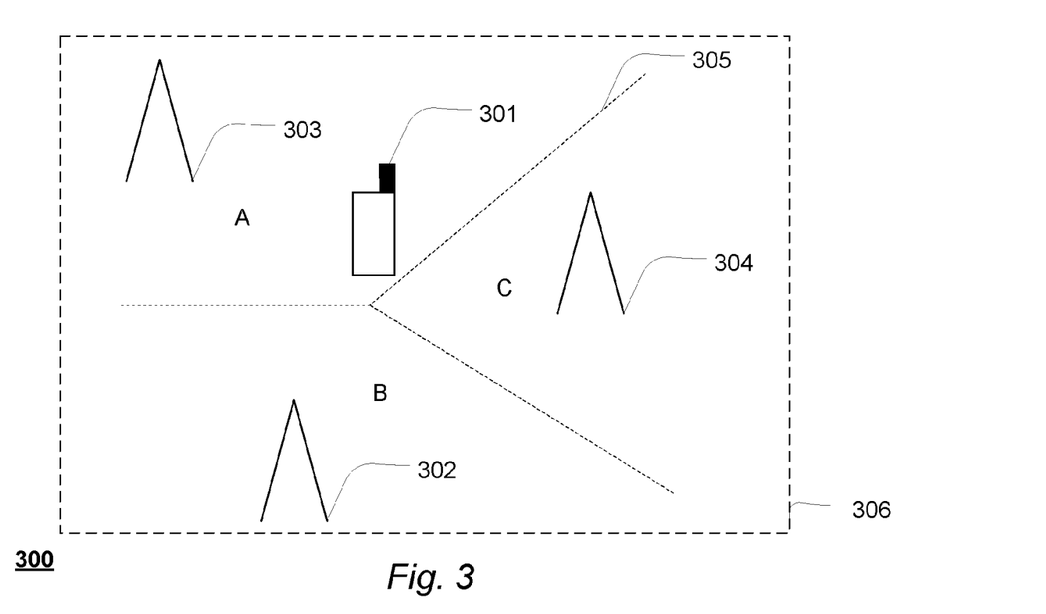
FIG. 3 shows a system 300 comprising a user equipment (UE) 301 such as a mobile communication device and a wireless network comprising a number of cells.

FIG. 3 shows a system 300 comprising a user equipment (UE) 301 such as a mobile communication device e.g. a mobile cellular telephone, for example a mobile cellular telephone, and a wireless network 306 comprising a number of cells 302, 303, 304. A cell may employ a base station such as for example an eNodeBs.

One or more of the cells 302, 303, 304 may, for example, be LTE TDD cells. Alternatively or additionally, a number of the cells 302, 303, 304 may, for example, be LTE FDD cells.

One of the cells, for example cell 303, may be the serving cell for the UE 301 whereby the UE 301 may be connected to said serving cell 303 and the UE 301 may, for example, receive data representing e.g. a telephone call and/or a SMS or the like, via said serving cell 303. Additionally or alternatively, the serving cell 303 may transmit reference symbols e.g. to the UE 301 connected to the serving cell 303.

The other cells 302, 304 may, for example, be neighbouring cells to the serving cell 303. The other cells 302, 304 may, for example, transmit data representing e.g. a telephone call and/or a SMS or the like, to UEs connected to the respective other cells 302, 304. Additionally or alternatively, the other cells may transmit reference symbols e.g. to the UEs connected to the respective other cells.

The dotted line 305 may, for example, represent cell edges defining respective areas A, B and C in which the cells 302, 303 and 304 are the respective serving cells.

In an example, the network 306 may be a dense network, such as for example in a city, wherein reference symbols from several neighbouring cells 302, 304 in the network 306 may interfere, partly or in whole, with the serving cell's 303 reference symbols.

For example, in a synchronized network such as for example LTE TDD, reference symbols from the cells 302, 303, 304 may interfere. Reference symbols from the cells 302, 303, 304 in LTE FDD may, for example, also interfere.

In an example, the network 306 may be a sparse network, such as for example a rural area network, wherein reference symbols neighbouring cells 302, 304 in a network 306 substantially do not interfere or interfere partly with the serving cell's 303 reference symbols. The network 306 may, for example, be a sparse LTE TDD or FDD network.

In a third example, the network 306 may be any type of network i.e. a dense network or a sparse network or a network with a density of cells anywhere in between the dense network's and the sparse network's density of cells such that the reference symbols from the neighbouring cells 302, 304 may interfere partly or in whole or may not interfere with the reference symbols from the serving cell 303.

Figure 2B:
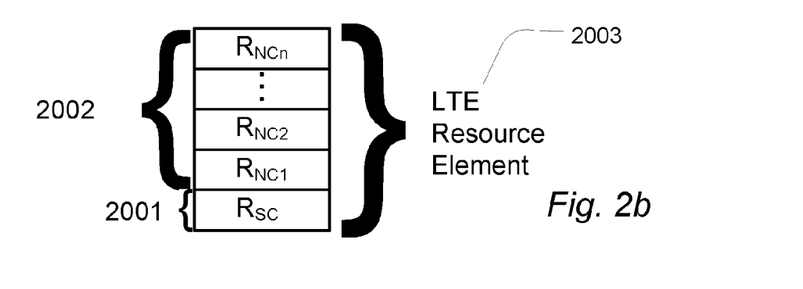
FIG. 2b shows a 3GPP LTE resource element comprising a number of reference symbols from a number of cells.

Thereby, the UE 301 connected to the serving cell 303 may receive, as shown in FIG. 2b, a number of reference symbols in a LTE resource element e.g. 4 reference symbols $R_{SC}$, $R_{NC1}$, $R_{NC2}$, $R_{NCn}$, wherein a first part 2001 of the reference symbols $R_{SC}$ in the LTE resource element may be transmitted from the serving cell 303 and wherein a second part 2002 of the reference symbols $R_{NC1}$, $R_{NC2}$, ..., $R_{NCn}$, may be transmitted from the neighbouring cells 302, 304.

Assuming reference symbol interference from neighbouring cells 302, 304, e.g. a non-empty second part 2002, on the reference symbols $R_{SC}$ from the serving cell 303, then the received reference symbol at the UE 301 $Y_{k,l}$ at subcarrier k and at time t e.g. at LTE resource element 2003, may be determined as $$Y_{k,l} = H_{k,l} + G_{k,l} c_{k,l} + \epsilon_{k,l}. \quad (1):$$

In the above equation (1), it is assumed that the serving cell's reference symbol is 1. Further, $H_{k,l}$ represents the channel for subcarrier k at time l between the serving cell 303 and the UE 301. $G_{k,l}$ may represent a sum of channels between neighbouring cells 302, 304 and the UE 301, wherein the neighbouring cells' reference symbols may interfere with the reference symbols of the serving cell 303 received at the UE 301. $c_{k,l}$ may represent a scrambling sequence at subcarrier k and at time l of the reference symbols transmitted by the neighbouring cells 302, 304. $\epsilon_{k,l}$ may represent white additive zero-mean noise with a variance $\sigma_{k,l}^{noise^2}$.

The UE 301 may determine a channel estimate $\hat{H}_{k,l}$, for example as disclosed above, and based on the channel estimate $\hat{H}_{k,l}$ and the received reference symbol $Y_{k,l}$, the UE 301 may determine an instantaneous noise-and-interference estimate $e_{k,l}$ as the difference between the estimated channel $\hat{H}_{k,l}$ and the received reference symbol $Y_{k,l}$:

$$e_{k,l} = \hat{H}_{k,l} - Y_{k,l}. \quad (2):$$

Based on the instantaneous noise-and-interference estimate $e_{k,l}$), the UE 301 may determine a first $\hat{\sigma}_{k,l}^{basic^2}$ and/or a second $\hat{\sigma}_{k,l}^{extended^2}$ noise-and-interference power estimate, wherein $$(3): \hat{\sigma}_{k,l}^{basic^2} = K_{bias} \sum_{\kappa,\lambda \in S(k,l)} e_{\kappa,\lambda}^H e_{\kappa,\lambda}, \text{ and}$$

$$(4): \hat{\sigma}_{k,l}^{extended^2} = \frac{K_{bias}}{2} \sum_{\kappa,\lambda \in S(k,l)} (e_{\kappa,\lambda-d} - e_{\kappa,\lambda})^H (e_{\kappa,\lambda-d}, e_{\kappa,\lambda}).$$

$K_{bias}$ may be a constant, the value of which constant may, for example, depend on the filtering applied to obtain the channel estimate $\hat{H}_{k,l}$ and/or on the size of the averaging set S(k,l).

$$\sum_{\kappa,\lambda \in S(k,l)} (\ldots)$$

is a summation over the indices κ,λ with values in the set S(k,l). S(k,l) may, for example, comprise all subcarriers in the bandwidth of the network 306 and one radio frame comprising 10 sub-frames. The superscript H denotes a Hermitian conjugation i.e. a complex conjugate transpose of the vector or matrix on which the Hermitian conjugation is performed.

d may be a number of symbols which corresponds to the length of the reference symbol scrambling sequence period. For example, in LTE, the scrambling sequence may be periodic with a period of 10 ms. 10 ms equals one radio frame equalling 10 sub-frames. A sub-frame may comprise 2 slots of 7 symbols/slot in a normal cyclic prefix length (6 symbols/slot in extended cyclic prefix length) and thus the length of the scrambling sequence period may be determined to be d=7symbols/slot*2slots/sub-frame*10sub-frames/radio-frame*1radio-frame=140symbols.

In an embodiment, the estimated noise-and-interference power is determined in the UE 301 as $$\hat{\sigma}_{k,l}^2 = \hat{\sigma}_{k,l}^{extended^2}. \quad (5):$$

The expectation value of the estimated noise-and-interference power may then be determined in the UE 301 as $$E\{\hat{\sigma}_{k,l}^2\} = E\{\hat{\sigma}_{k,l}^{extended^2}\} = \sigma_{k,l}^2 + E\{(G_{k,l-d} - G_{k,l})^H (G_{k,l-d} - G_{k,l})\}, \quad (6):$$

where $c_{k,l} = c_{k,l-d}$ and where $E\{\ldots\}$ represent a mathematical expectation. $\sigma_{k,l}^2$ represents the actual noise-and-interference power of the reference symbol received by the UE 301 from the serving cell 303.

If the change in neighbouring cell channels with respect to the serving cell is small i.e. if for example the UE 301 moves at a low speed e.g. a Doppler frequency up to and including for example 10 Hz, then $G_{k,l-d} \approx G_{k,l}$ whereby the second term on the right-hand side of equation (6) approximates zero.

A carrier frequency of, for example, 2.6 GHz and a Doppler frequency of 10 Hz corresponds to a speed of the UE of $$v = \frac{\Delta f \cdot c}{f} = \frac{10 \text{ Hz} \cdot 3 \cdot 10^8 \text{ m/s}}{2.6 \text{ GHz}} \approx 1.2 \text{ m/s} = 4.3 \text{ km/h},$$

where v is the speed of the UE e.g. in km/h, $\Delta f$ is the Doppler frequency in Hz, c is the speed of light in vacuum in m/s and f is the carrier frequency in Hz.

A carrier frequency of, for example, 700 MHz and a Doppler frequency of 10 Hz corresponds to a speed of the UE of $$v = \frac{\Delta f \cdot c}{f} = \frac{10 \text{ Hz} \cdot 3 \cdot 10^8 \text{ m/s}}{700 \text{ MHz}} \approx 4.3 \text{ m/s} = 15.5 \text{ km/h},$$

where v is the speed of the UE e.g. in km/h, $\Delta f$ is the Doppler frequency, c is the speed of light in vacuum and f is the carrier frequency.

Thereby, an estimate of the actual noise-and-interference power $\sigma_{k,l}^2$ of the reference symbol received by the UE 301 from the serving cell 303 may be determined in the UE 301 approximately as the expectation value of the estimated noise-and-interference power $\hat{\sigma}_{k,l}^{extended^2}$ e.g. when the velocity which the UE moves with is low i.e. approximately below or equal to a Doppler frequency of 10 Hz:

$$E\{\hat{\sigma}_{k,l}^2\} = E\{\hat{\sigma}_{k,l}^{extended^2}\} \quad (7)$$

$$= E\left\{\frac{K_{bias}}{2} \sum_{\kappa,\lambda \in S(k,l)} (e_{\kappa,\lambda-d} - e_{\kappa,\lambda})^H (e_{\kappa,\lambda-d} - e_{\kappa,\lambda})\right\}$$

$$\approx \sigma_{k,l}^2.$$

Thus, the UE 301 may, using the above equation (7), be able to determine an estimate of the actual noise-and-interference power $\sigma_{k,l}^2$ of the reference symbol received by the UE 301 from the serving cell 303 accurately using the second $\hat{\sigma}_{k,l}^{extended^2}$ noise-and-interference power estimate. For example, the UE 301 may utilize equation (7) to determine an estimate of the actual noise-and-interference power $\sigma_{k,l}^2$ when the UE 301 velocity is below or equal to a Doppler frequency of 10 Hz.

If the UE 301 determines an estimate of the actual noise-and-interference power $\sigma_{k,l}^2$ of the reference symbol received by the UE 301 from the serving cell 303 using the first $\hat{\sigma}_{k,l}^{basic^2}$ noise-and-interference power estimate i.e. $\hat{\sigma}_{k,l}^2 \equiv \hat{\sigma}_{k,l}^{basic^2}$, then the UE 301 may determine the estimate of the actual noise-and-interference power $\sigma_{k,l}^2$ of the reference symbol to be $$E\{\hat{\sigma}_{k,l}^2\} = E\{\hat{\sigma}_{k,l}^{basic^2}\} \quad (8)$$

$$= E\left\{K_{bias} \sum_{\kappa,\lambda \in S(k,l)} e_{\kappa,\lambda}^H e_{\kappa,\lambda}\right\}$$

$$= \sigma_{k,l}^2 + E\{G_{k,l}^H G_{k,l}\},$$

which may be an overestimate of the actual noise-and-interference power $\sigma_{k,l}^2$ of the reference symbol received by the UE 301 from the serving cell 303 by $E\{G_{k,l}^H G_{k,l}\}$.

In an embodiment, the UE 301 may determine the estimated noise-and-interference power of the reference symbol received by the UE 301 from the serving cell 303 as $$\hat{\sigma}_{k,l}^2 = \min(\hat{\sigma}_{k,l}^{extended^2}, \hat{\sigma}_{k,l}^{basic^2}), \quad (9):$$

where min is a mathematical function taking the smallest of the two values $\hat{\sigma}_{k,l}^{extended^2}, \hat{\sigma}_{k,l}^{basic^2}$ and if $\hat{\sigma}_{k,l}^{extended^2} = \hat{\sigma}_{k,l}^{basic^2}$ then taking either one of $\hat{\sigma}_{k,l}^{extended^2}, \hat{\sigma}_{k,l}^{basic^2}$.

Thereby, the UE 301 may be able to determine the estimate of the actual noise-and-interference power of the reference symbol received by the UE 301 from the serving cell 303 as $$E\{\hat{\sigma}_{k,l}^2\} = E\{\min(\hat{\sigma}_{k,l}^{extended^2}, \hat{\sigma}_{k,l}^{basic^2})\} = \sigma_{k,l}^2 + \min\{E[(G_{k,l-d} - G_{k,l})^H (G_{k,l-d} - G_{k,l})], E[G_{k,l}^H G_{k,l}]\} \quad (10):$$

In an UE 301 moving at a low speed e.g. a Doppler frequency up to and including for example 10 Hz, the estimate of the actual noise-and-interference power $\sigma_{k,l}^2$ may be determined as provided in equation (10) and in this case equation (10) approximates equation (7) because in this case $E[(G_{k,l-d} - G_{k,l})^H (G_{k,l-d} - G_{k,l})] < E[G_{k,l}^H G_{k,l}]$.

Additionally or alternatively, in an UE 301 moving at a high speed e.g. a Doppler frequency above for example 10 Hz, the estimate of the actual noise-and-interference power $\sigma_{k,l}^2$ may be determined as provided in equation (10). In this case, either $E[(G_{k,l-d} - G_{k,l})^H (G_{k,l-d} - G_{k,l})]$ or $E[G_{k,l}^H G_{k,l}]$ may be the smallest term. Alternatively, $E[(G_{k,l-d} - G_{k,l})^H (G_{k,l-d} - G_{k,l})] = E[G_{k,l}^H G_{k,l}]$.

Figure 4A:
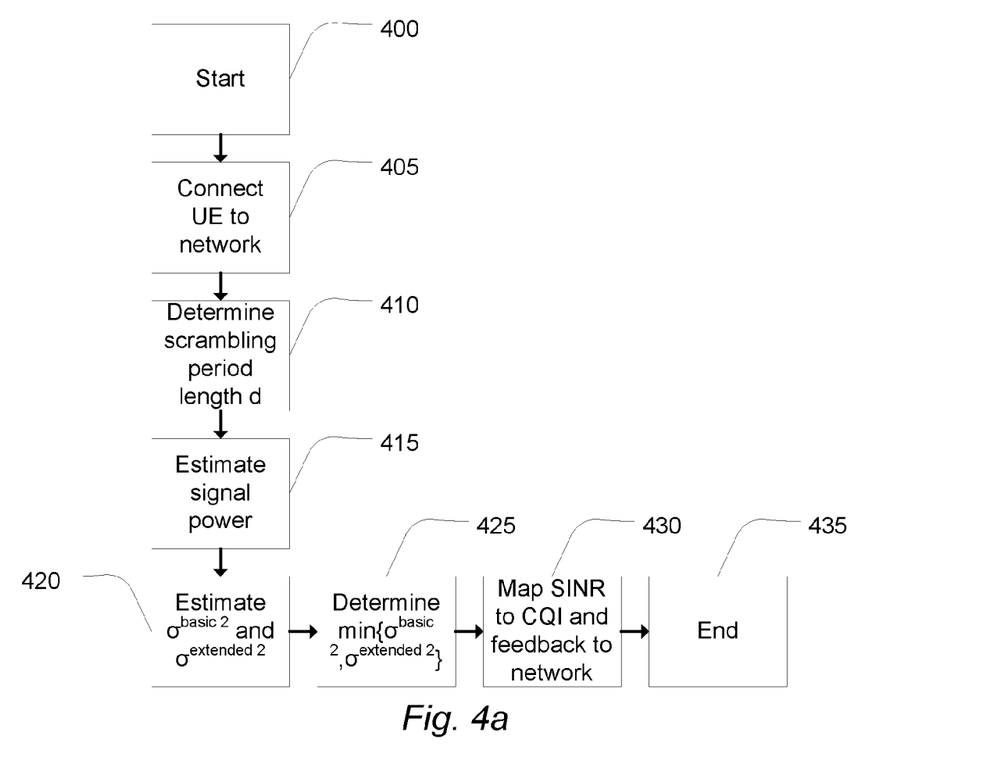
FIG. 4a shows a flow chart of an embodiment of determining a quality of a received signal.

FIG. 4a shows a flow chart of an embodiment of determining a quality of a received signal.

The method starts in step 400

In step 405, the UE 301 may connect to a network 306, for example, by connecting to a serving cell such as 303.

In step 410, the UE 301 may determine a scrambling sequence period length d of the reference symbols received from the serving cell 303 and the neighbouring cells 302, 304.

In step 415, the UE 301 may estimate the channel power e.g. the channel between the UE 301 and the serving cell 303.

In step 420, the UE 301 may determine the first $\hat{\sigma}_{k,l}^{basic^2}$ and the second $\hat{\sigma}_{k,l}^{extended^2}$ noise-and-interference power estimate e.g. in a processor adapted to use equations (3) and (4)

above to determine the first $\hat{\sigma}_{k,l}^{basic^2}$ and the second $\hat{\sigma}_{k,l}^{extended^2}$ noise-and-interference power estimate.

In step 425, the UE 301 may determine an estimated noise-and-interference power e.g. in a processor adapted to use equations (3) and (4) and (9) above to determine the estimated noise-and-interference power $\hat{\sigma}_{k,l}^2$ and thus the estimate of the actual noise-and-interference power $\sigma_{k,l}^2$.

In step 430, the UE 301 may determine a CQI-value from a table correlating $\sigma_{k,l}^2$ to CQI-value e.g. by using $\sigma_{k,l}^2$ as an index in the table to determine the CQI-value. The table may, for example, be stored in a memory of the UE 301. The CQI-value may be transmitted from the UE 301 to the network 306, e.g. via the serving cell 303.

In step 435, the method ends.

Figure 4B:
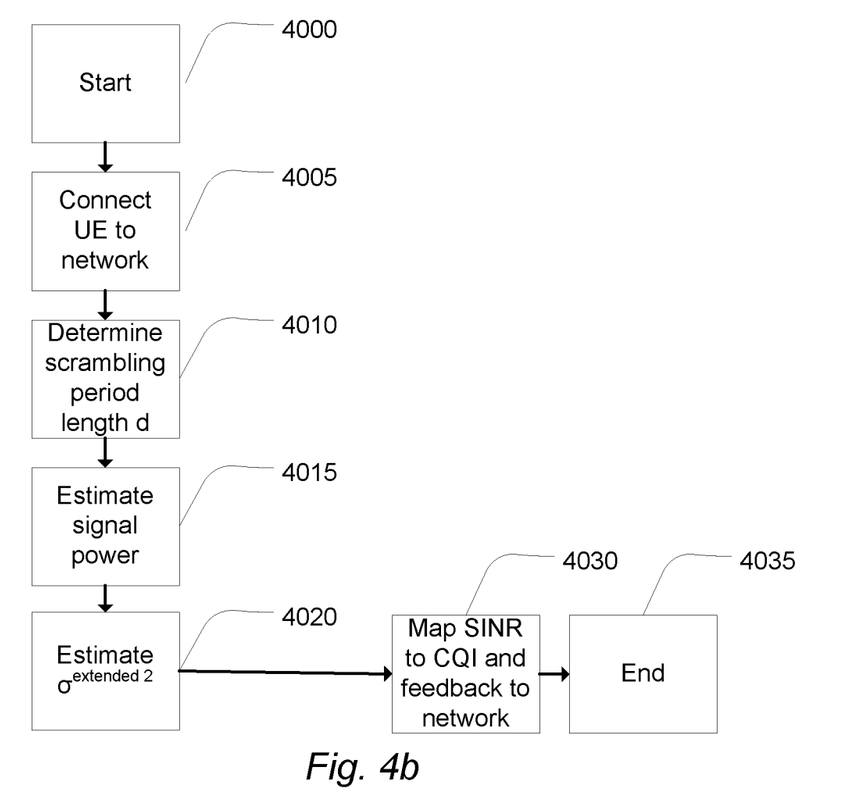
FIG. 4b shows a flow chart of an embodiment of determining a quality of a received signal.

FIG. 4b shows a flow chart of an embodiment of determining a quality of a received signal.

The method starts in step 4000. Steps 4005-4015 are identical to steps 405-415 of FIG. 4a.

In step 4020, the UE 301 may determine the second $\hat{\sigma}_{k,l}^{extended^2}$ noise-and-interference power estimate e.g. in a processor adapted to use equations (4) above to determine the second $\hat{\sigma}_{k,l}^{extended^2}$ noise-and-interference power estimate.

In step 4030, the UE 301 may determine a CQI-value from a table correlating $\hat{\sigma}_{k,l}^{extended^2}$ to CQI-value e.g. by using $\hat{\sigma}_{k,l}^{extended^2}$ as an index in the table to determine the CQI-value. The table may, for example, be stored in a memory of the UE 301. The CQI-value may be transmitted from the UE 301 to the network 306, e.g. via the serving cell 303.

In step 4035, the method ends.

Figure 5:
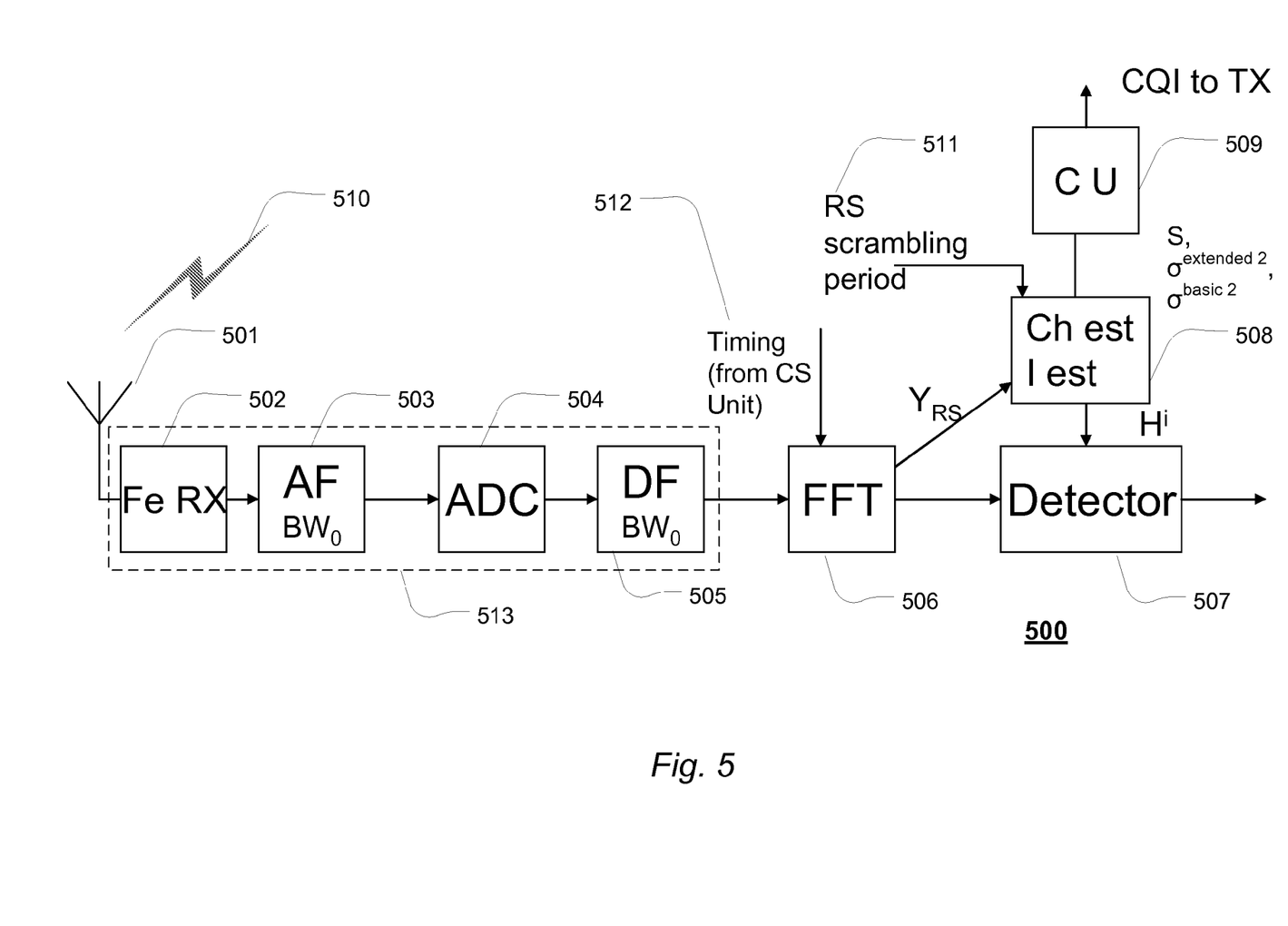
FIG. 5 shows an embodiment of a device for determining a quality of a received signal.

FIG. 5 shows an embodiment of a device for determining a quality of a received signal. The device 500 may, for example, be part of a mobile communication device 301.

The device 500 may comprise an antenna 501. For example, the device 500 may be connected to an antenna 501 of a mobile communication device 301. The antenna 501 may receive a signal 510 from the network 300 via, for example, a serving cell 303.

The received signal 510 may, for example, comprise data regarding one or more reference symbols and/or a periodic scrambling sequence and/or data representing e.g. a telephone call and/or a SMS or the like.

The received signal 510 may be down-converted to a base band signal in a front-end receiver 502. The base band signal may be analogue filtered in an analogue filter 503 and the analogue filtered signal may be converted to a digital signal in an analogue to digital converter (ADC) 504. The digital signal may be digital filtered in a digital filter 505.

A fast Fourier transformer (FFT) 506 may determine a frequency-domain representation of the digital filtered signal. From the frequency-domain representation of the digital filtered signal, the FFT may determine the resource elements corresponding to reference symbols and the resource elements may be transmitted to a channel and interference estimator 508. In order to determine the resource elements corresponding to reference symbols, the FFT may receive and utilize timing information 512 from a cell search unit e.g. contained in a UE 301. The timing information may be determined by the cell search unit e.g. from the primary and secondary synchronizations signals.

The channel and interference estimator 508 may determine, for example, the estimate of the actual noise-and-interference power $\sigma_{k,l}^2$ based on equation (7). Additionally, the channel and interference estimator 508 may determine, for example, the estimate of the actual noise-and-interference power $\sigma_{k,l}^2$ based on equation (8). In order to determine the estimate of the actual noise-and-interference power $\sigma_{k,l}^2$ based on equation (7), the channel and interference estimator 508 may receive information regarding reference symbol periodicity 511. The reference symbol periodicity may be determined based on information on, for example, cell identification, and cyclic prefix length (six symbols in extended cyclic prefix length and seven symbols in normal cyclic prefix length). The cyclic prefix length and the cell identification may, for example, be received from the network via the serving cell. The channel and interference estimator 508 may, for example, determine the reference symbol scrambling sequence period length d (i.e. the reference symbol scrambling periodicity) from a number of indirect estimations during cell search or the channel and interference estimator 508 may, for example, receive the reference symbol scrambling sequence period length d in the neighbouring cell list via the serving cell.

The estimates of the actual noise-and-interference power $\sigma_{k,l}^2$ based on equation (7) and equation (8) may be transmitted to a control unit 509 from the channel and interference estimator 508. The control unit 509 may, for example, determine a minimum of the estimates the actual noise-and-interference power $\sigma_{k,l}^2$ obtained using equations (7) and (8). The control unit 509 may map the SINR and the pre-coding matrix and the rank to a CQI value e.g. via a lookup in a table using the SINR and the estimated pre-coding matrix and the rank as indices. In an example, the rank and the pre-coding matrix may be determined from the channel estimate and a noise estimate. The control unit 509 may transmit the CQI to the network 306 e.g. via the serving cell 303.

In an embodiment, the device 500 may comprise a detector 507. The detector 507 may, for example, perform data demodulation utilizing the channel estimate received from the channel and interference estimator 508 and a symbol received from the FFT 506.

In an embodiment, the device 500 may comprise a comparator comparing $\hat{\sigma}_{k,l}^{extended^2}$ to $\hat{\sigma}_{k,l}^{basic^2}$. If the comparator determines that $\hat{\sigma}_{k,l}^{extended^2}$ is equal to or substantially equal to $\hat{\sigma}_{k,l}^{basic^2}$, e.g. $\hat{\sigma}_{k,l}^{extended^2}$ is equal to $\hat{\sigma}_{k,l}^{basic^2}$ within 5%, then the comparator may conclude that the interference is due to real noise i.e. "neighbour-free noise" or substantially "neighbour-free noise". If the comparator determines that $\hat{\sigma}_{k,l}^{extended^2}$ is different from $\hat{\sigma}_{k,l}^{basic^2}$, e.g. by more than 5%, then the comparator may conclude that the interference is due to reference symbols transmitted from neighbours. The conclusion reached by the comparator, e.g. neighbour-free or neighbour-made noise, may be transmitted to the network 306 e.g. via serving cell 303. The network 306 may, for example, utilize the conclusion in e.g. interference coordination schemes.

In an embodiment, a receiver 513 may comprise the front-end receiver 502 and the analogue filter 503 and the analogue to digital converter 504 and the digital filter 505.

Figure 6:
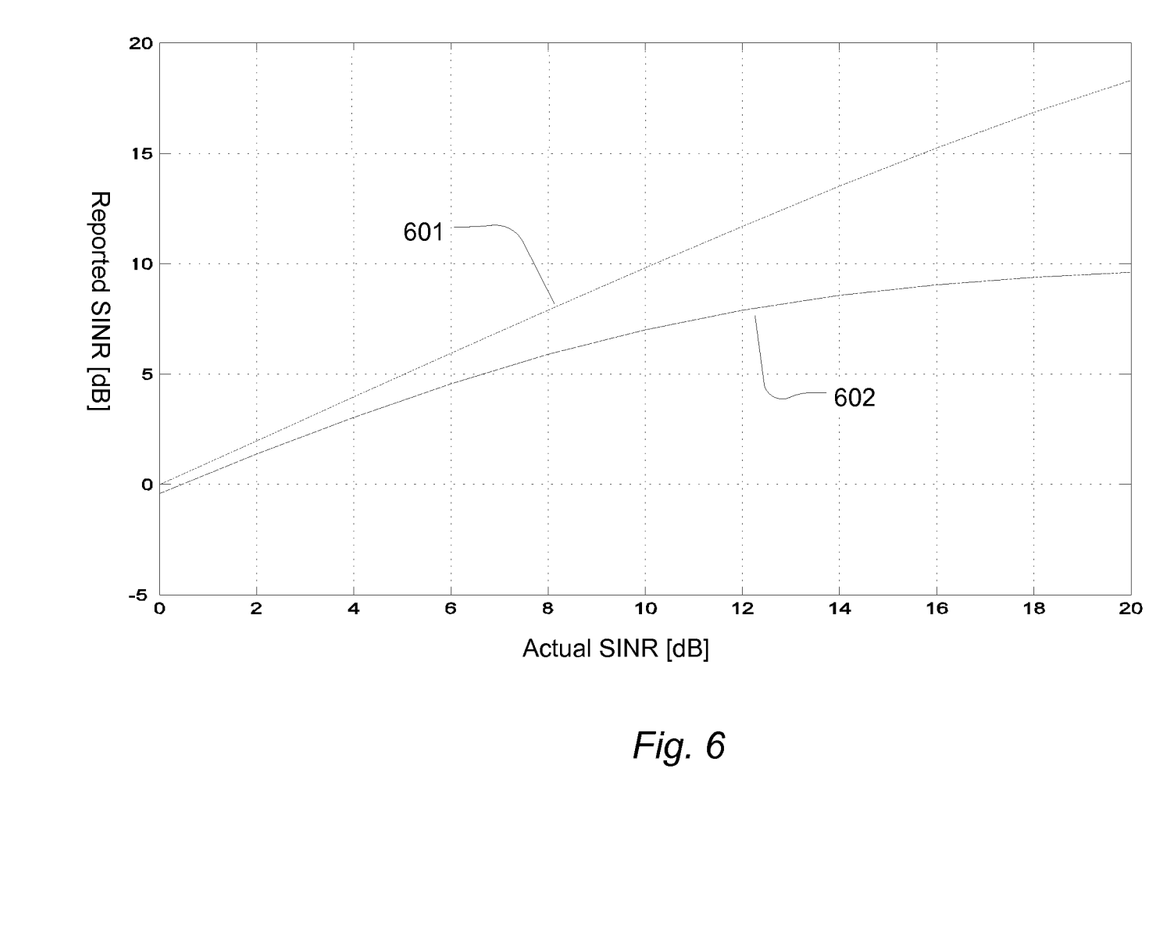
FIG. 6 shows an example of an advantage of utilizing an embodiment to determine CQI.

FIG. 6 shows an example of an advantage of utilizing an embodiment to determine CQI. In the example of FIG. 6, the neighbouring cell's 302, 304 reference symbols are assumed to have a power 10 dB lower than the power of the reference symbols of the serving cell 303.

The actual SINR axis represents the actual SINR level in dB. The reported SINR axis represents the SINR reported by a mobile communication device moving at a Doppler frequency of 5 Hz and performing the SINR estimation using equation (7) 601 and using equation (8) 602 respectively.

As may be seen, equation (7) is able to approximate the actual noise-and-interference power more accurately than equation (8) and thereby, a UE 301 reporting CQI using equation (7) at e.g. low Doppler frequencies is able to obtain higher data rates from a serving cell 303 than a UE reporting using equation (8).

In one aspect, a part of an entity, e.g. received reference symbols, may, for example, comprise the entire entity, e.g. the entire received reference symbols, or the part of the entity may comprise a proper subset of the entity. The sum of the first and the second parts of the received reference symbols equals the received reference symbols.

Although various embodiments of the present invention have been described and shown, the invention is not restricted thereto, but may also be embodied in other ways within the scope of the subject-matter defined in the following claims.

In general, any of the technical features and/or embodiments described above and/or below may be combined into one embodiment. Alternatively or additionally any of the technical features and/or embodiments described above and/or below may be in separate embodiments. Alternatively or additionally any of the technical features and/or embodiments described above and/or below may be combined with any number of other technical features and/or embodiments described above and/or below to yield any number of embodiments.

In device claims enumerating several means, several of these means can be embodied by one and the same item of hardware. The mere fact that certain measures are recited in mutually different dependent claims or described in different embodiments does not indicate that a combination of these measures cannot be used to advantage.

It should be emphasized that the term "comprises/comprising" when used in this specification is taken to specify the presence of stated features, integers, steps or components but does not preclude the presence or addition of one or more other features, integers, steps, components or groups thereof.

The invention claimed is:

1. A method of determining a quality of a received signal, the method comprising:
   receiving a signal comprising a first part and a second part, said first part comprising reference symbols transmitted from a serving cell, said second part comprising reference symbols transmitted from one or more neighbouring cells, wherein a scrambling sequence of the second part is periodic according to a scrambling sequence period; and
   determining a first noise-and-interference power of said first part by removing interference of said second part using the scrambling sequence period.

2. The method according to claim 1, wherein said determining comprises summing over a first frequency interval and a first time-interval the product of the Hermitian conjugate of a first difference with the first difference itself, said first difference comprising the difference between a first and second instantaneous noise-and-interference estimate, the first instantaneous noise-and-interference estimate comprising the difference between a channel estimate and a received signal at a first time, and the second instantaneous noise-and-interference estimate comprising that same difference at a second time, wherein the difference between the first and second time equals a multiple of the scrambling sequence period.

3. The method according to claim 1, wherein said determining comprises determining the first noise-and-interference power according to the equation $$\hat{\sigma}_{k,l}^{extended\,2} = \frac{K_{bias}}{2} \sum_{\kappa,\lambda \in S(k,l)} (e_{\kappa,\lambda-d} - e_{\kappa,\lambda})^H (e_{\kappa,\lambda-d} - e_{\kappa,\lambda}), \text{ wherein } \frac{K_{bias}}{2}$$

is a constant, wherein $$\sum_{\kappa,\lambda \in S(k,l)} (\ldots)$$

is a summation over the indices $\kappa,\lambda$ with values in the set $S(k,l)$ of an instantaneous noise-and-interference estimate $e_{\kappa,\lambda}$ at subcarrier frequency $\kappa$ and time-instance $\lambda$, wherein H denotes a Hermitian conjugation, and wherein d comprises the length of said scrambling sequence period.

4. The method according to claim 1, further comprising:
   determining a second noise-and-interference power by summing over a first frequency interval and a first time-interval the product of the Hermitian conjugate of a first difference with the first difference itself, the first difference comprising the difference between a channel estimate and a received signal, and
   determining a minimum of the first noise-and-interference power and the second noise-and-interference power.

5. The method according to claim 4, further comprising:
   comparing the first noise-and-interference power to the second noise-and-interference power,
   if the first noise-and-interference power is not substantially equal to the second noise-and-interference power, determining that interference between said first part and said second part is due to neighbour interference;
   otherwise if the first noise-and-interference power is substantially equal to the second noise-and-interference power, determining that interference between said first part and said second part is due to other sources.

6. The method according to claim 4, further comprising determining a channel quality index (CQI) value from a lookup table, using the minimum of the first noise-and-interference power and the second noise-and-interference power as index to the lookup table.

7. The method according to claim 4 wherein the method is implemented by a user equipment, and wherein the method further comprises determining the quality of the received signal as either:
   the first noise-and-interference power, if a velocity of the user equipment is in a range up to and including a Doppler frequency of 10 Hertz (Hz); or
   the minimum of the first noise-and-interference power and the second noise-and-interference power otherwise.

8. The method according to claim 1 wherein determining the first noise-and-interference power of the first part comprises determining the first noise-and-interference power of the first part by removing interference of the second part based on sample by sample differences between instantaneous noise-and-interference estimates determined for the second part and instantaneous noise-and interference estimates determined for the second part one or more scrambling sequence periods away.

9. The method according to claim 1 wherein determining the first noise-and-interference power of the first part comprises determining the first noise-and-interference power of the first part by removing interference based on differences between instantaneous samples from multiple scrambling sequence periods of the second part of the received signal.

10. A device for determining a quality of a received signal, wherein the device comprises:
    at least one receiver configured to receive a signal comprising a first part and a second part, said first part comprising reference symbols transmitted from a serving cell, said second part comprising reference symbols transmitted from one or more neighbouring cells, wherein a scrambling sequence of the second part is periodic according to a scrambling sequence period; and at least one estimator configured to determine a first noise-and-interference power of said first part by removing interference of said second part using a length of the scrambling sequence period.

11. The device according to claim 10, wherein the at least one estimator is configured to determine the first noise-and-interference power by summing over a first frequency interval and a first time-interval the product of the Hermitian conjugate of a first difference with the first difference itself, said first difference comprising the difference between a first and second instantaneous noise-and-interference estimate, the first instantaneous noise- and-interference estimate comprising the difference between a channel estimate and a received signal at a first time, and the second instantaneous noise-and-interference estimate comprising that same difference at a second time, wherein the difference between the first and second time equals a multiple of the scrambling sequence period.

12. The device according to claim 10, wherein the at least one estimator is further configured to determine a second noise-and-interference power by summing over a first frequency interval and a first time-interval the product of the Hermitian conjugate of a first difference with the first difference itself, the first difference comprising the difference between a channel estimate and a received signal, and wherein the device further comprises a control unit configured to determine a minimum of the first noise-and-interference power and the second noise-and-interference power.

13. The device according to claim 12, further comprising a comparator configured to:
compare the first noise-and-interference power to the second noise-and-interference power,
if the first noise-and-interference power is not substantially equal to the second noise-and-interference power, determine that interference between said first part and said second part is due to neighbour interference;
otherwise if the first noise-and-interference power is substantially equal to the second noise-and-interference power, determine that interference between said first part and said second part is due to other sources.

14. The device according to claim 12, further comprising a control unit configured to determine a channel quality index (CQI) value from a lookup table, using the minimum of the first noise-and-interference power and the second noise-and-interference power as index to the lookup table.

15. The device according to claim 12, wherein the device is configured to determine the quality of the received signal as either:

the first noise-and-interference power, if a velocity of the device is in a range up to and including a Doppler frequency of 10 Hz; or the minimum of the first noise-and-interference power and the second noise-and-interference power otherwise.

16. The device according to claim 10 wherein the estimator is configured to determine the first noise-and-interference power of the first part by removing interference of the second part based on sample by sample differences between instantaneous noise-and-interference estimates determined for the second part and instantaneous noise-and interference estimates determined for the second part one or more scrambling sequence periods away.

17. The device according to claim 10 wherein the estimator is configured to determine the first noise-and-interference power of the first part by removing interference based on differences between instantaneous samples from multiple scrambling sequence periods of the second part of the received signal.

18. A system for determining a quality of a received signal, wherein the system comprises a serving cell, one or more neighboring cells, and a device, wherein the device comprises:

at least one receiver configured to receive a signal comprising a first part and a second part, said first part comprising reference symbols transmitted from the serving cell, said second part comprising reference symbols transmitted from the one or more neighbouring cells, wherein a scrambling sequence of the second part is periodic according to a scrambling sequence period; and at least one estimator configured to determine a first noise-and-interference power of said first part by removing interference of said second part using a length of the scrambling sequence period.

19. The system according to claim 18 wherein the at least one estimator is configured to determine the first noise-and-interference power of the first part by removing interference of the second part based on sample by sample differences between instantaneous noise-and-interference estimates determined for the second part and instantaneous noise-and interference estimates determined for the second part one or more scrambling sequence periods away.

20. The system according to claim 18 wherein the at least one estimator is configured to determine the first noise-and-interference power of the first part by removing interference based on differences between instantaneous samples from multiple scrambling sequence periods of the second part of the received signal.

* * * * *

UNITED STATES PATENT AND TRADEMARK OFFICE
CERTIFICATE OF CORRECTION

PATENT NO. : 8,503,946 B2
APPLICATION NO. : 13/059892
DATED : August 6, 2013
INVENTOR(S) : Lindoff et al.

Page 1 of 3

It is certified that error appears in the above-identified patent and that said Letters Patent is hereby corrected as shown below:

In the Drawings:

Delete Sheet 3 and substitute the attached Sheet 3 therefor.

In Fig. 4a, Sheet 3 of 6, delete "  " and insert --  --, therefor.

In the Specification

In Column 1, Line 57, delete " $\hat{\sigma} = E\{K_{bias}(\hat{H}-Y)^H(\hat{H}-Y)\}$ ," and Signed and Sealed this
Eighteenth Day of February, 2014

Michelle K. Lee
*Deputy Director of the United States Patent and Trademark Office* insert -- $\hat{\sigma}^2 = \mathbf{E}\left\{K_{bias}\left(\hat{H}-Y\right)^H\left(\hat{H}-Y\right)\right\}$, --, therefor.

In Column 8, Line 42, delete "$e_{k,l}$)," and insert -- $e_{k,l}$, --, therefor.

In Column 11, Line 36, delete "network 300" and insert -- network 306 --, therefor.

In the Claims

In Column 14, Line 53, in Claim 8, delete "noise-and interference" and insert -- noise-and-interference --, therefor.

In Column 16, Line 11, in Claim 16, delete "noise-and interference" and insert -- noise-and-interference --, therefor.

In Column 16, Lines 41-42, in Claim 19, delete "noise-and interference" and insert -- noise-and-interference --, therefor.

Fig. 3

Fig. 4a